United States Patent [19]

Schmaling et al.

[11] 4,315,683
[45] Feb. 16, 1982

[54] CAM YOKE FOR ELECTROPHOTOCOPIER RECIPROCATING CARRIAGE

[75] Inventors: Roderick N. Schmaling, Brookfield Center; Warren E. Olson, New Canaan, both of Conn.

[73] Assignee: Pitney Bowes Inc., Stamford, Conn.

[21] Appl. No.: 183,517

[22] Filed: Sep. 2, 1980

[51] Int. Cl.³ .................... G03G 15/28; F16H 19/06
[52] U.S. Cl. .................................. 355/8; 74/27; 74/37; 355/3 R; 355/66
[58] Field of Search ............... 355/8, 3 R, 49, 51, 355/57, 60, 65, 66, 81, 84; 74/27, 55, 89.2, 37

[56] References Cited

U.S. PATENT DOCUMENTS

| | | |
|---|---|---|
| 3,697,165 | 10/1972 | Morriston et al. ............. 355/8 |
| 3,907,422 | 9/1975 | Eppe et al. ................. 355/8 |
| 4,118,117 | 10/1978 | Kolzumi et al. ............. 355/8 |
| 4,124,288 | 11/1978 | Zeuthen .................... 355/8 |

FOREIGN PATENT DOCUMENTS 2031803 4/1980 United Kingdom ............... 355/8

*Primary Examiner*—Richard L. Moses
*Attorney, Agent, or Firm*—Lawrence E. Sklar; William D. Soltow, Jr.; Albert W. Scribner

[57] ABSTRACT

An improvement in an electrophotocopying machine having a reciprocating carriage driven by a constant speed chain having a drive pin coupled thereto. The improvement comprises a camming yoke fixedly connected to the reciprocating carriage and disposed in a plane parallel to the plane of the constant speed chain, the camming yoke having an opening therein to receive the drive pin. The opening is defined at its top and bottom by extended, substantially horizontal camming surfaces and at its sides by substantially vertical camming surfaces.

4 Claims, 4 Drawing Figures

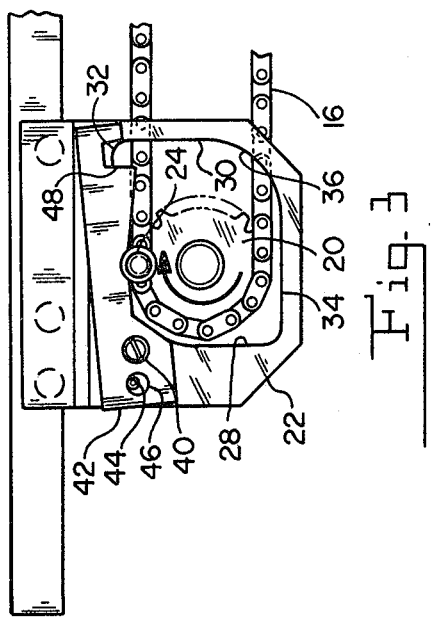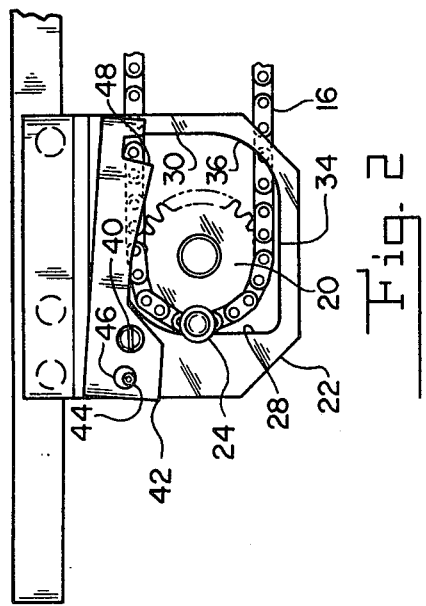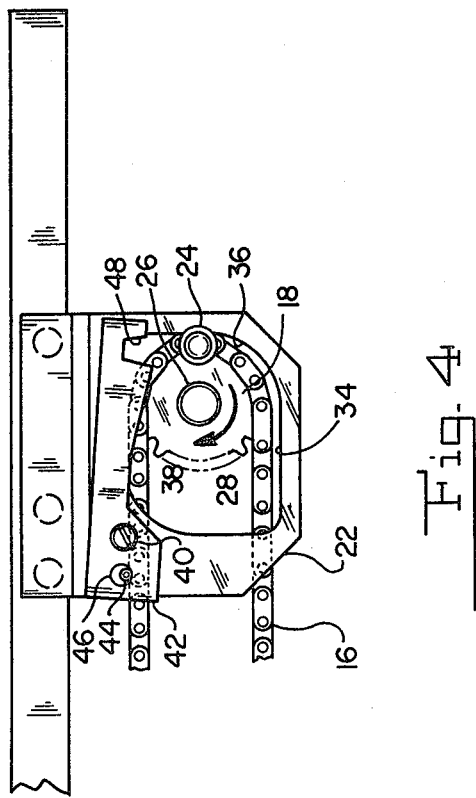

CAM YOKE FOR ELECTROPHOTOCOPIER RECIPROCATING CARRIAGE

BACKGROUND OF THE INVENTION

The instant invention relates to electrophotocopiers having chain driven reciprocating carriages for supporting an original document to be scan exposed, and more particularly to a camming yoke for coupling the reciprocating carriage to its drive chain.

In many electrophotocopiers marketed today, a reciprocating carriage is employed in order to scan expose an original document supported thereon. The reciprocating carriage is typically driven by a constant speed chain rotatably supported by two sprockets disposed one near each end of the path of the reciprocating carriage. A T-shaped yoke is coupled to the carriage and a drive pin is coupled to the drive chain and vertically movable inside a verticle slot in the yoke. See, for example, U.S. Pat. No. 3,512,886, issued May 19, 1970. In this situation, the stroke of the reciprocating carriage is identical in length to the distance between the two sprockets supporting the drive chain. It is generally desirable to minimize the stroke of the carriage in order to minimize the space requirements for the copier, to increase the stability of the carriage, and to minimize the likelihood of the carriage becoming jammed. However, the length of the drive chain and the distance between the sprockets supporting the drive chain are generally determined by other parameters of machine design, such as synchronization with the photoreceptor belt, and thus cannot be reduced as a means of reducing the stroke of the carriage.

In reciprocating carriage type photocopiers, frequently when a maximum length copy is being made, the platen, in the course of its stroke, will completely pass over the transparent, exposure window, thereby allowing illumination from the photocopier to directly impinge on the operator. A shutter is employed in the copier to obviate this problem. In such case, it is desirable to shorten the stroke of the reciprocating carriage to be able to eliminate the need for a shutter.

The foregoing problems are overcome by the instant invention which provides a unique camming yoke for coupling the reciprocating carriage to the drive chain so that the stroke of the reciprocating carriage becomes less than the distance between the sprockets supporting the drive chain.

SUMMARY OF THE INVENTION

Accordingly, the instant invention provides an improvement in an electrophotocopying machine having a reciprocating carriage driven by a constant speed chain having a drive pin coupled thereto. The improvement comprises a camming yoke fixedly connected to the reciprocating carriage and disposed in a plane parallel to the plane of the constant speed chain, the camming yoke having an opening therein to receive the drive pin. The opening is defined at its top and bottom by extended, substantially horizontal camming surfaces and at its sides by substantially vertical camming surfaces.

BRIEF DESCRIPTION OF THE DRAWINGS

FIG. 2 is a side elevational view of the camming yoke seen in FIG. 1 in its extreme left position;

FIG. 3 is the same as FIG. 2 except the pawl on the yoke has been raised by the drive pin preparatory to the pin engaging the yoke;

FIG. 4 is the same as FIG. 2 except that the camming yoke is seen in its extreme right position.

DETAILED DESCRIPTION

Figure 1:
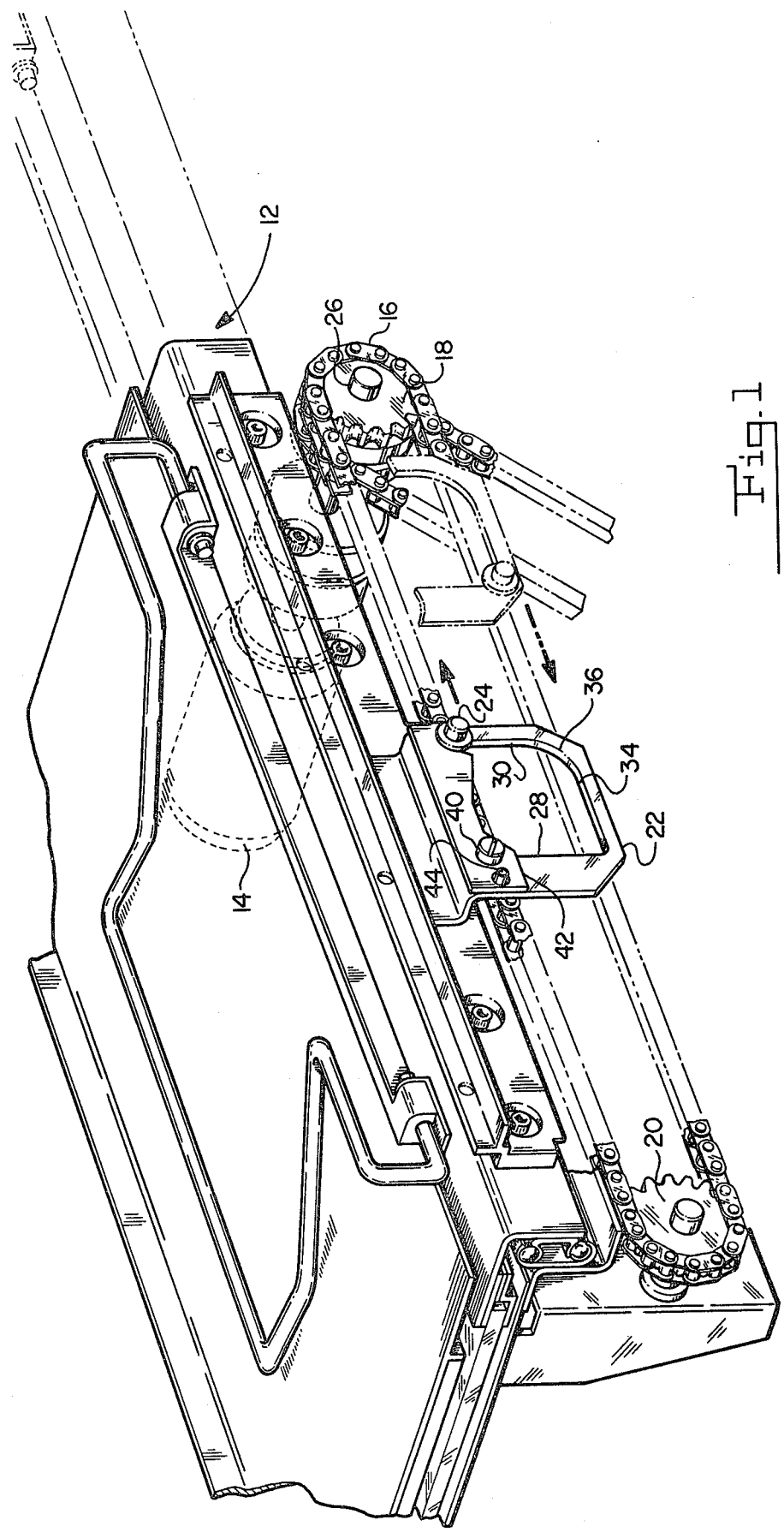
FIG. 1 is a schematic perspective view of an electrophotocopying machine having a reciprocating carriage and employing a camming yoke in accordance with the instant invention.

In describing the preferred embodiment of the instant invention, reference is made to the drawings wherein there is seen in FIG. 1 a reciprocating carriage 12 which is movably mounted on top of a cabinet housing of an electrophotocopier (not shown). During a copy cycle, the carriage 12 moves to the left a predetermined distance that is long enough to enable the copier to make copies of fourteen inch long documents.

The carriage 12 and other driven components (not shown) are driven by the main motor 14. A carriage drive chain 16 travels around two sprockets 18 and 20 that are disposed one near each end of the path of the carriage 12. A camming yoke 22, discussed in further detail hereinafter, is coupled to the carriage 12 and a drive pin 24 is coupled to the drive chain 16 and moves both vertically and horizontally inside the camming yoke 22. The carriage sprocket 18 is coaxially mounted on the drive shaft 26 of the main motor 14. As the motor 14 turns, the chain 16 is driven around the sprockets 18 and 20. The drive pin 24 pulls the yoke 22 (on the carriage 12) along with the chain 16. As the pin 24 travels around either sprocket 18 and 20 the carriage 12 is first slowed and then reversed in its direction of travel to achieve reciprocal motion.

The camming yoke 22 is characterized by an opening defined by rearward and forward vertical camming surfaces 28 and 30 respectively and a pair of extended horizontal surfaces 32 and 34. Extending between the forward vertical camming surface 30 and the lower horizontal camming surface 34 is a first arcuate camming surface 36. Similarly, extending between the vertical camming surface 28 and the upper horizontal camming surface 32 is a second arcuate camming surface 38.

Pivotably secured to the top of the camming yoke 22 by means of a bolt 40 is a pawl 42. Adjacent the bolt 40 is a pin 44 extending from the yoke 22 through an aperture 46 in the pawl 43 for limiting the rotational movement of the pawl 42. At the other end of the pawl 42 is a slot 48 for receiving the drive pin 24.

The pawl 42, while not necessary for the proper functioning of the yoke 22, is desirable because it prevents chatter and vibration in the carriage 12 during its translational movement, and because it prevents overdriving the carriage 12 manually during the scan (i.e., left to right) portion of the cycle.

In the home position of the carriage 12, the pin 24 is situated as seen in FIG. 2. During the scan portion of the carriage cycle, the pin 24 is then driven up to the position shown in FIG. 3 during which time the slot 48 of the pawl 42 is rotated upwardly until the pin 24 reaches the slot 48 at which time the pawl 42 rotates downwardly and the carriage 12 begins the scan portion of its cycle. The pin 24 is thus surroundingly engaged by the slot 48, as seen in FIG. 1, until the pin 24 reaches the sprocket 18. It can be seen that the pin 24 does not drive the yoke 22 until it engages the slot 48. This lost motion arises due to the upper horizontal camming surface 32 and the arcuate camming surface 38.

When the pin 24 reaches the sprocket 18, the yoke 22 is slowed down until the pin 24 reaches the position shown in FIG. 4. The pin 24 then traverses the arcuate camming surface 36 and the lower horizontal camming surface 34 during which the yoke 22 is not driven. When the pin 24 reaches the vertical camming surface 28, the yoke 22 is driven to the left, thereby causing the carriage 12 to return to its home position. When the pin 24 reaches the sprocket 20, the yoke 22 is slowed down until the pin 24 reaches the position shown in FIG. 2, which represents the end of one cycle and the starting position of the next cycle.

While a particular embodiment of the invention has been shown and described, it should be understood that the invention is not limited thereto since many modifications may be made. It is therefore contemplated to cover by the present application any and all such modifications as fall within the true spirit and scope of the appended claims.

What is claimed is:

1. In an electrophotocopying machine having a reciprocating carriage driven by a constant speed chain having a drive pin coupled thereto, the improvement comprising a camming yoke fixedly connected to said reciprocating carriage and disposed in a plane parallel to the plane of the constant speed chain, said camming yoke having an opening therein to receive said drive pin, said opening being defined at its top and bottom by extended, substantially horizontal camming surfaces and at its sides by substantially vertical camming surfaces.

2. The improvement of claim 1, additionally comprising a pawl pivotably secured to the top of the camming yoke and having a slot therein for receiving said drive pin.

3. The improvement of claim 2, wherein said opening additionally includes a first arcuate camming surface extending between the forward vertical camming surface and the lower horizontal camming surface.

4. The improvement of claim 3, wherein said opening additionally includes a second arcuate camming surface extending between the rearward vertical camming surface and the upper horizontal camming surface.

* * * * *